July 29, 1952     M. FAVRET     2,604,754
REGULATOR CONSTRUCTION
Filed Jan. 7, 1952     2 SHEETS—SHEET 1
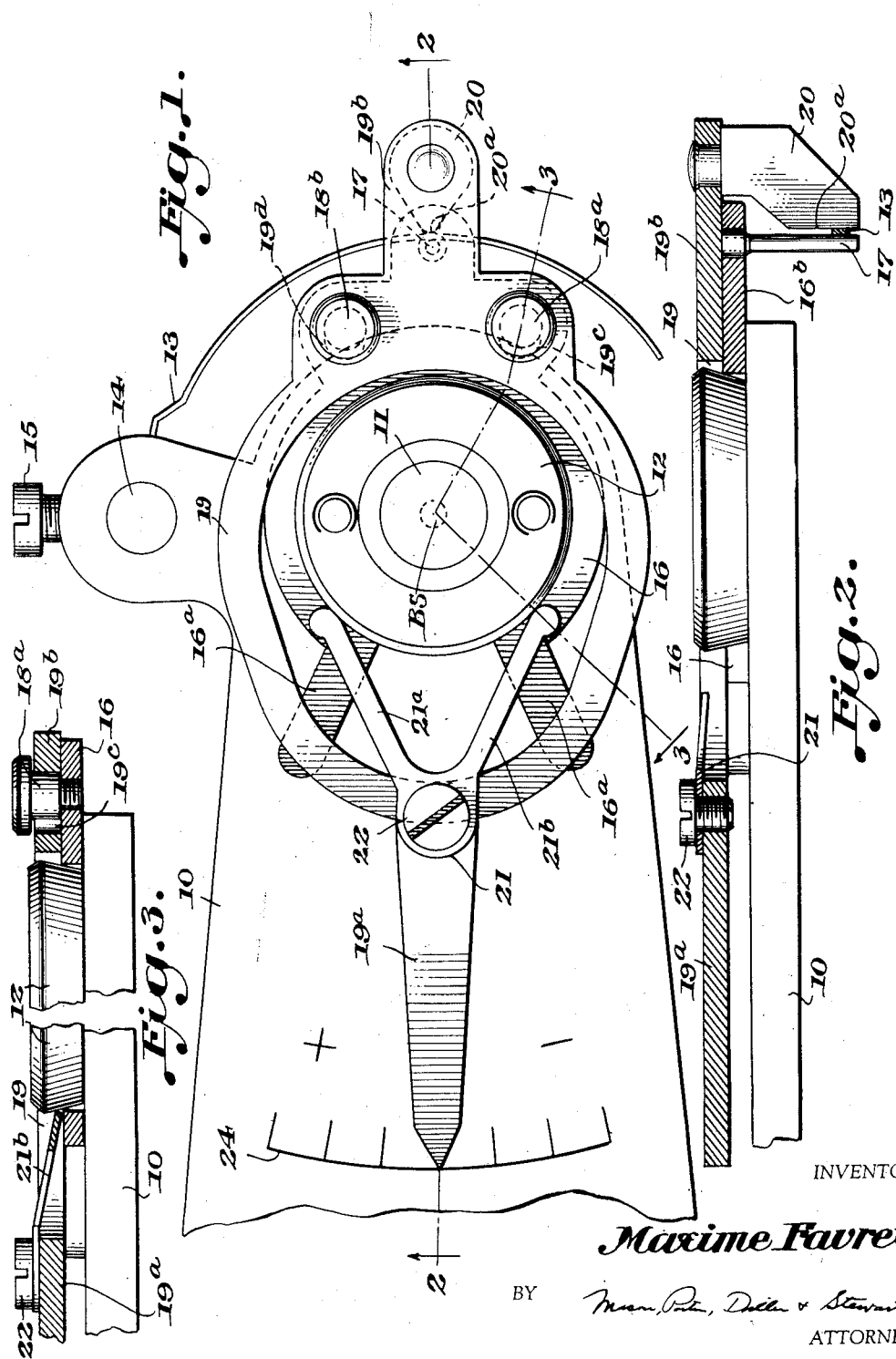
INVENTOR
*Maxime Favret.*
BY
ATTORNEYS

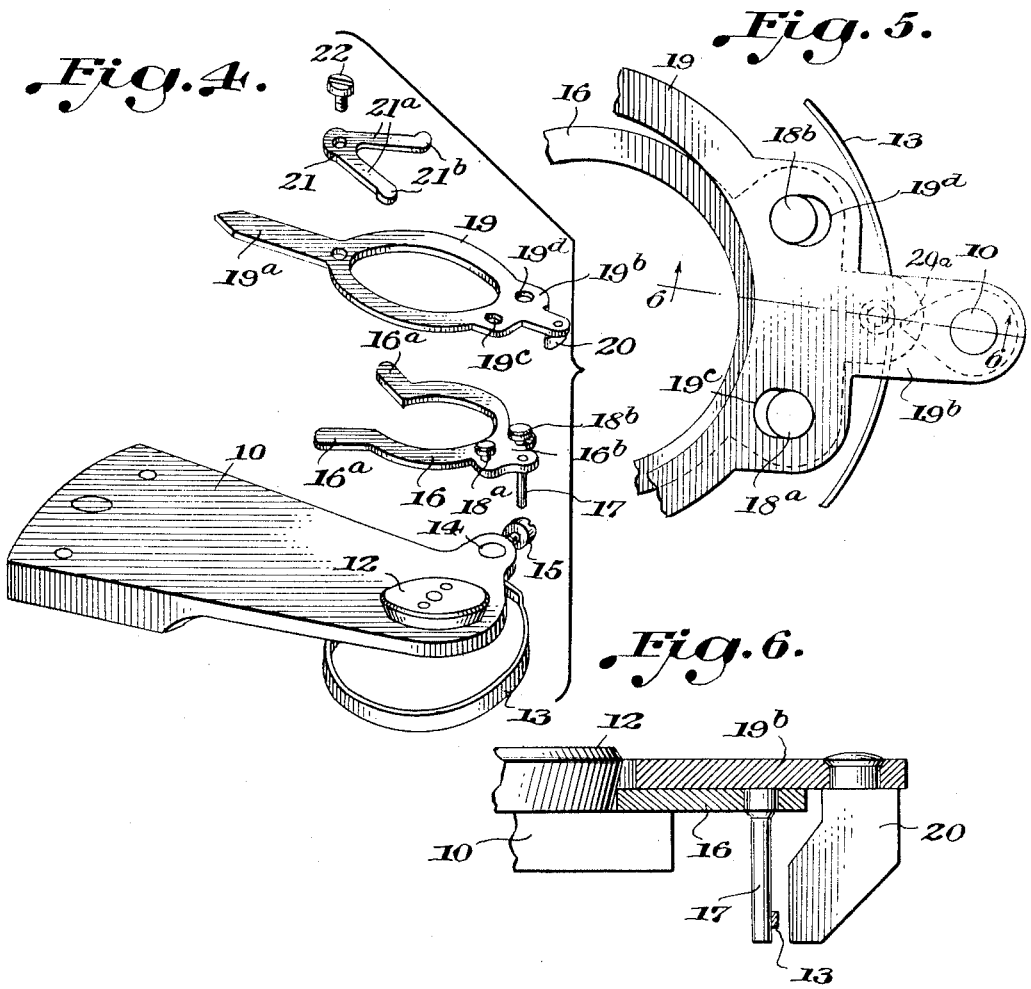

Patented July 29, 1952

2,604,754

UNITED STATES PATENT OFFICE 2,604,754

REGULATOR CONSTRUCTION

Maxime Favret, Elgin, Ill., assignor to Elgin National Watch Company, Elgin, Ill., a corporation of Illinois Application January 7, 1952, Serial No. 265,285

4 Claims. (Cl. 58—113)

This invention relates to improvements in regulator constructions for vibrating spring devices, and is particularly adapted for employment in clocks, watches and like timepieces having hairsprings for controlling the rate of movement of an oscillating part.

A feature of the invention is the provision of a regulator structure which has members for gripping the spring at any of a number of regulated points and includes parts which upon movement for changing adjustment serve to release the spring and which after the movement serve to return the members to gripping position.

Another feature is the provision of a regulator structure which has cooperative members for gripping the spring and mounted for movement about the axis of the oscillating part, one such member also having a permitted radial movement relative to such axis and a rocking movement relative to another member, such members including parts for gripping the spring, and a resilient element for controlling the motion of said members.

A further feature is the provision of a regulator structure which has cooperative members for gripping the spring and mounted for movement about the axis of the oscillating part, one such member also having a permitted radial movement relative to such axis, a pair of spaced fulcra connecting such members relative to another member whereby movement of a member about said axis can produce such radial movement and release the spring, and a resilient element for controlling the motion of said members.

With these and other features as objects in view, an illustrative form of practice has been shown in the accompanying drawings, in which:

Fig. 1 is a plan view of the assembly, with the parts in gripping position.

Fig. 2 is a cross-sectional view essentially on broken line 2—2 of Fig. 1.

Fig. 3 is a fragmentary cross-sectional view essentially on line 3—3 of Fig. 1.

Fig. 4 is a perspective view showing the parts separated but stacked in their relative positions.

Fig. 5 is a diagram showing the parts in releasing position.

Fig. 6 is a cross-sectional view corresponding to a part of Fig. 2, but the parts in the releasing position of Fig. 5 and essentially on line 6—6 of Fig. 5.

It is a practice in vibrating spring devices, such as clocks and watches, to employ a hairspring secured at one end to the frame and at the other end to the oscillating part such as the balance assembly; and to control the rate of oscillation by engaging the spring at variable distances from its fixed end. A common practice is to have a regulator lever which can be rocked about the balance axis and which has two regulator or curb pins for engaging the inner and outer surfaces of the outer convolution of the hairspring. These pins may be loose, so that this outer convolution shifts back and forth between them, wherewith the spring operates under three conditions (a) engaged with the inner pin, (b) free between the pins, (c) engaged with the outer pin, and performs at different rates under each condition so that changes in the balance motion or amplitude of the balance arc will employ more or less of each condition during the stroke and the rate will be indeterminate but averaging over the time interval between windings. If the pins are tight upon the outer convolution, so that the spring performs essentially as though its length is that from the the inner end to the regulator pins, a difficulty arises in regulation, in that the pins should be released prior to regulation: since the pins pass across the hairspring plane, bending the pins is fraught with trouble as the hairspring may be damaged or the pins so bent that they do not later properly grip the hairspring.

It has been proposed to have one of the regulator pins, usually the outer, rotatable about its axis and formed with an offset portion to grip the hairspring. Such devices have the difficulty that the initial releasing and final gripping movements cause the adjustable pin to move and scrape along the hairspring, possibly changing the regulation and often producing a bodily movement of the spring about the balance axis so that the system is thrown out of beat.

More complex arrangements have been proposed, but have difficulties in manufacture or servicing. For example, it is desirable to have the parts cleaned from time to time—an operation usually performed by separating them and leaving in a cleaning solution, followed by reassembly: with some complex arrangements, subassemblies cannot be separated for cleaning and grit or solution remains between the parts to impair lubrication and operation, or if separable, lengthy assembly and adjustment time must be spent.

In the structure shown on the accompanying drawings, the invention is incorporated in a watch movement having a balance cock 10 with a balance staff bearing 11 in a balance dome 12 with the usual conical surfaces. The balance staff BS determines the axis of the balance assembly. The outer convolution 13 of the hairspring is shown as engaged in the stud 14 held by the stud screw 15.

A first and split regulator member 16 is resilient and has annular portions tightly fitting the dome 12 for frictionally maintaining the regulated position. The member 16 has outstanding arms 16a at either side of its split; and a projection 16b supporting a regulator or curb pin 17 for engaging the inner surface of the outer convolution 13 of the hairspring, and also fixedly supporting a pair of fulcrum pivots 18a, 18b, spaced apart along a line spaced from the balance axis, and illustratively spaced equally from the common plane of the balance axis and the regulator pin 17.

A second regulator member 19 has a large aperture for loosely fitting around the dome 12, and has a lever extension 19a and a projection 19b which overlies the projection 16b; the projection 19b has two slots 19c, 19d for receiving the pivots 18a, 18b with limited permissive relative motion in the plane of the member 19. The projection 19b has an aperture in which is tightly fixed, as by riveting, a second regulator pin 20 having a surface 20a formed by a rounded edge for engaging the outer surface of the outer convolution 13 of the hairspring.

A spring member 21 is secured to the member 19, as by the screw 22 and has two arms 21a, 21b which bear against the dome 12 in the assembled state, and exert an effort to force the member 19 radially away from the balance axis. By design of parts, the friction between the arms 21a, 21b and the dome 12 is less than the friction of the member 16 thereon.

When the watch is in running condition, the parts may be in the relative positions of Figs. 1 and 2, for one state of regulation. The lever 19a here indicates a central position on the scale 24 of the balance cock. The spring member 21 grips the dome and is holding the regulator member 19 in its leftward position with the regulator pin 20 pressing against the hairspring convolution 13 in the common plane of the balance system and the regulator pin 17 so that the hairspring is gripped firmly.

If the watch is slow at this stage of regulation, i. e. the balance system should be speeded up, the regulator lever 19a is moved relatively upward or clockwise in Fig. 1, by pressure thereon. The spring member 21 is carried along in this movement, and the arms 21a, 21b yield and slip on the balance dome. The regulator member 16 remains momentarily in position, so that the member 19 turns about fulcrum 18a, while its slot 19d permits free movement at the fulcrum 18b. The regulator pin 20 is carried with the projection 19b, and moves away from the hairspring convolution 13 in an arc about the axis established by fulcrum 18a, thus freeing the hairspring. Shortly thereafter, the end of slot 19d comes against the fulcrum 18b, Fig. 5, and further movement of the lever 19a delivers a positive rotation effort to the member 16 and overcomes the frictional engagement with the dome 12, so that the member 19 and its regulator pin 17 are also moved in a clockwise direction in Figs. 1 and 5 by an arcuate amount determined by the continued movement of the lever 19a along the scale 24. Since the pin 17 has little or no friction against the hairspring, the peripheral force upon the hairspring is insignificant.

When a desired arcuate distance has been traversed by the regulator pin 17, the pressure upon the lever 19a is discontinued, and the lever is allowed to return under the action of the spring 21. This return movement of the lever 19a and member 19 is accompanied by a return rocking about the fulcrum 19a, and the regulator pin 20 moves back in its arc about this fulcrum so that it engages and again presses the hairspring convolution 13 against the pin 17, and the spring is now gripped firmly at a new position of regulation.

If the rate is fast, pressure is exerted against the other edge of the lever 19a, and the member 19 is moved counterclockwise, with pivoting about the fulcrum 18b while the fulcrum 18a is free in slot 19c and with release of the hairspring by pin 20, until the end of slot 19c encounters and moves the fulcrum 18a and therewith the member 16 and pin 17. Upon release of the lever, clamping occurs by the action of spring member 21.

The parts are simple and the major pieces may be formed by simple stamping operations. If pre-assembled, they can be applied by engaging the member 16 on the end of the dome 12, with the pin 17 inside the hairspring convolution 13, and spreading the arms 16a so that the member 16 passes around the dome. The spring member 21 has its arms 21a, 21b forced downward to engage the dome. The member 19 is forced toward the right and downward, Figs. 1 and 2, the spring 21 yielding, until the pin 20 is outside and in the plane of the hairspring convolution 13 and the member 19 embraces the dome. The spring 21 returns the member 19 toward the right, and assembly is complete.

The lever arm is moved through a small arc, for releasing the hairspring, before it produces movement of the first member 16. This arc can be determined by the length of the slots 19c, 19d; and preferably is a commensurate portion of a division on scale 24, for example a unit or half unit. Assuming that a half unit is employed in the design, the rating adjuster observes the prevailing position of parts, and notes the effect in seconds per day, of regulation by one unit on the scale. Further assuming that movement of the pins by two units in the "plus" or clockwise direction is believed proper, the adjuster moves the lever arm 19a by two and a half units, and then releases the lever, whereupon the spring 21 causes the system to restore itself and grip the hairspring at a position two units distant in the clockwise peripheral direction of the hairspring from the position formerly occupied. That is, the effective length of the hairspring has been shortened by two units.

Obviously the parts may also be removed and reassembled as separate elements if so desired; or the removed assembly can be separated for cleaning.

The invention can be embodied in other structural forms, within the scope of the appended claims.

I claim:

1. A regulator structure for a vibrating spring device having a frame and a vibrating spring, comprising a first member and a first regulator pin carried thereby, said member being movable relative to the frame to position the first regulator pin relative to the spring for regulation thereof, a second member movable relative to the frame, a fulcrum pivot coactive with said members, a second regulator pin on said second member and moving from and toward the spring in an arc about said fulcrum when the second member is moved relative to said first member, and a spring for moving said second member relative to said first member for causing said second regulator pin to approach said first pin.

2. A regulator structure for a timepiece having a frame, a balance system and a hairspring, comprising a first member rockable on the frame about the axis of the balance system, a first regulator pin carried thereby and extending for engagement with the hairspring, a second member and a second regulator pin carried thereby for engagement with the hairspring opposite said first pin, a fulcrum pivot coactive with said members so that the second member can rock relative to the first member about an axis spaced from the axis of the balance system, and therewith moving the second pin in an arc toward and from the first pin, and a spring member for rocking said second member relative to the first member for causing the second pin to approach said first pin.

3. A regulator structure for a timepiece having a frame, a balance system, and a hairspring, comprising a first member rockable about an axis on the frame, a first regulator pin carried by the first member and movable therewith along the hairspring, a second member having a pair of spaced slots, fulcrum pivots on the first member engaged in said slots about which the second member may be selectively rocked relative to the first member, a second regulator pin carried by the second member and rockable during the rocking thereof whereby the second pin moves about the selected fulcrum in an arc toward and from the first pin, and a spring member acting upon the second member to cause the second pin to approach the first pin.

4. A regulator structure for a timepiece having a balance dome, a balance system, and a hairspring, comprising a first member rockably engaging the dome and having resilient friction thereagainst, a first regulator pin carried by the first member and movable therewith about the axis of the balance system and along the length of the hairspring, a second member rockably engageable with the dome and movable radially relative to the said axis, a pair of fulcrum pivots on said first member spaced apart at equal distances from the common plane of the axis and the first pin, said second member having a pair of slots of limited length for receiving the pins, a second regulator pin carried by said second member opposite said first pin and rockable therewith in arcs about the fulcrum pivots, and a spring member secured to the second member and engaging the dome for causing the second pin to approach the first pin.

MAXIME FAVRET.

No references cited.